(12) United States Patent
Schick et al.

(10) Patent No.: US 10,255,943 B1
(45) Date of Patent: Apr. 9, 2019

(54) INDEPENDENT HEAD, DUAL READER CONTROL LOGIC

(71) Applicant: Seagate Technology LLC, Cupertino, CA (US)

(72) Inventors: Thomas Lee Schick, Arvada, CO (US); Timothy F Ellis, Tonka Bay, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/982,929

(22) Filed: May 17, 2018

(51) Int. Cl.
*G11B 20/20* (2006.01)
*G11B 20/10* (2006.01)
*G11B 5/596* (2006.01)

(52) U.S. Cl.
CPC .... *G11B 20/10027* (2013.01); *G11B 5/59622* (2013.01); *G11B 5/59655* (2013.01); *G11B 5/59688* (2013.01); *G11B 20/10046* (2013.01)

(58) Field of Classification Search
CPC ....... G11B 20/0013; G11B 5/09; G11B 20/10; G11B 5/02; G11B 20/10027
USPC ........................................ 360/46, 39, 67, 68
See application file for complete search history.

(56) References Cited

U.S. PATENT DOCUMENTS

| | | | |
|---|---|---|---|
| 4,270,154 A | 5/1981 | Crawford | |
| 4,423,448 A | 12/1983 | Frandsen | |
| 4,544,972 A | 10/1985 | Kogure et al. | |
| 4,851,939 A | 7/1989 | Seo et al. | |
| 4,933,795 A | 6/1990 | Nigam | |
| 5,050,169 A | 9/1991 | Monett | |
| 5,218,496 A | 6/1993 | Kaczeus | |
| 5,223,993 A | 6/1993 | Squires et al. | |
| 5,285,436 A | 2/1994 | Moribe | |
| 5,293,282 A | 3/1994 | Squires et al. | |
| 5,297,024 A | 3/1994 | Carobolante | |
| 5,341,351 A | 8/1994 | Ng | |
| 5,343,345 A | 8/1994 | Gilovich | |
| 5,343,347 A | 8/1994 | Gilovich | |
| 5,355,486 A | 10/1994 | Cornaby | |
| 5,471,733 A | 12/1995 | Bernett et al. | |
| 5,477,401 A | 12/1995 | Squires et al. | |

(Continued)

FOREIGN PATENT DOCUMENTS

| | | |
|---|---|---|
| EP | 0977181 A2 | 2/2000 |
| GB | 757684 A | 9/1956 |

(Continued)

*Primary Examiner* — Nabil Z Hindi
(74) *Attorney, Agent, or Firm* — Cesari & Reed, LLP; Kirk A. Cesari

(57) ABSTRACT

An apparatus may include a preamplifier configured to be connected to a plurality of magnetic read/write heads, wherein each of the magnetic read/write heads includes a read sensor to read data from a disc and a write element to write data to the disc. The preamplifier may include a first set of registers configured to indicate a first head of the plurality of magnetic read/write heads that is selected for reading data, a second set of registers configured to indicate a second head of the plurality of magnetic read/write heads that is selected for reading data, an input line configured to receive a control signal to activate reading data from the first head substantially simultaneously with reading data from the second head, a first output to provide data from the first head, and a second output to provide data from the second head.

20 Claims, 5 Drawing Sheets

(56) References Cited

U.S. PATENT DOCUMENTS

| | | |
|---|---|---|
| 5,523,901 A | 6/1996 | Anderson et al. |
| 5,589,777 A | 12/1996 | Davis et al. |
| 5,761,007 A | 6/1998 | Price et al. |
| 5,774,291 A | 6/1998 | Contreras et al. |
| 5,805,386 A | 9/1998 | Faris |
| 5,901,010 A | 5/1999 | Glover et al. |
| 5,983,485 A | 11/1999 | Misso |
| 5,991,124 A | 11/1999 | Forbord |
| 6,005,743 A | 12/1999 | Price et al. |
| 6,057,990 A | 5/2000 | Gilovich |
| 6,081,399 A | 6/2000 | Lee et al. |
| 6,121,742 A | 9/2000 | Misso |
| 6,160,676 A | 12/2000 | Takaishi |
| 6,344,938 B1 | 2/2002 | Smith |
| 6,384,998 B1 | 5/2002 | Price et al. |
| 6,437,937 B1 | 8/2002 | Guo et al. |
| 6,449,130 B1 | 9/2002 | Koyama |
| 6,490,138 B1 | 12/2002 | Prater |
| 6,493,172 B1 | 12/2002 | Morris et al. |
| 6,519,109 B1 | 2/2003 | Price et al. |
| 6,542,326 B1 | 4/2003 | Ell et al. |
| 6,560,075 B2 | 5/2003 | Price et al. |
| 6,563,657 B1 | 5/2003 | Serrano et al. |
| 6,603,640 B1 | 8/2003 | Prater et al. |
| 6,678,120 B2 | 1/2004 | Money |
| 6,690,549 B1 | 2/2004 | Aikawa et al. |
| 6,693,760 B1 | 2/2004 | Krounbi et al. |
| 6,735,032 B2 | 5/2004 | Dunn et al. |
| 6,768,610 B1 | 7/2004 | Morris et al. |
| 6,819,513 B2 | 11/2004 | Chainer et al. |
| 6,847,504 B1 | 1/2005 | Bennett et al. |
| 6,885,513 B1 | 4/2005 | Baker |
| 6,914,746 B1 | 7/2005 | Meyer |
| 6,952,322 B1 | 10/2005 | Codilian et al. |
| 7,012,777 B1 | 3/2006 | Hirano et al. |
| 7,031,115 B1 | 4/2006 | Gilovich |
| 7,102,842 B1 | 9/2006 | Howard |
| 7,133,233 B1 | 11/2006 | Ray et al. |
| 7,146,623 B2 | 12/2006 | Kuwajima et al. |
| 7,199,981 B2 | 4/2007 | Zabtcioglu |
| 7,315,429 B2 | 1/2008 | van Zyl |
| 7,385,781 B1 | 5/2008 | Craig et al. |
| 7,469,463 B2 | 12/2008 | Prater et al. |
| 7,492,542 B2 | 2/2009 | van Zyl |
| 7,710,683 B2 | 5/2010 | Craig et al. |
| 7,760,463 B2 | 7/2010 | Ward et al. |
| 8,028,311 B2 | 9/2011 | Gilovich |
| 8,693,126 B2 | 4/2014 | Buckholdt et al. |
| 9,087,541 B1 | 7/2015 | Pokharel et al. |
| 9,142,246 B1 | 9/2015 | Trantham et al. |
| 9,202,477 B2 * | 12/2015 | Buch .................. G11B 5/012 |
| 9,336,829 B2 | 5/2016 | Zhang et al. |
| 9,401,161 B1 | 7/2016 | Jury et al. |
| 9,576,597 B2 | 2/2017 | Trantham et al. |
| 2002/0039259 A1 | 4/2002 | Koyama et al. |
| 2012/0206830 A1 | 8/2012 | Gao et al. |
| 2012/0250177 A1 | 10/2012 | Somanache et al. |

FOREIGN PATENT DOCUMENTS

| | | |
|---|---|---|
| JP | S52145017 A | 12/1977 |
| JP | S59218677 A | 12/1984 |
| JP | S63306567 A | 12/1988 |
| JP | H0411302 A | 1/1992 |
| JP | H05257613 A | 10/1993 |
| JP | H07169185 A | 7/1995 |
| JP | H10172252 A | 6/1998 |
| KR | 20040045190 A | 6/2004 |
| WO | 2012064226 A1 | 5/2012 |

* cited by examiner

INDEPENDENT HEAD, DUAL READER CONTROL LOGIC

SUMMARY

In certain embodiments, an apparatus may include a preamplifier configured to be connected to a plurality of magnetic read/write heads, wherein each of the magnetic read/write heads includes a read sensor to read data from a disc and a write element to write data to the disc. The preamplifier may include a first set of registers configured to indicate a first head of the plurality of magnetic read/write heads that is selected for reading data, a second set of registers configured to indicate a second head of the plurality of magnetic read/write heads that is selected for reading data, an input line configured to receive a control signal to activate reading data from the first head substantially simultaneously with reading data from the second head, a first output to provide data from the first head, and a second output to provide data from the second head.

In certain embodiments, a system may include a preamplifier configured to be connected to a plurality of magnetic read/write heads, wherein each of the magnetic read/write heads includes a read sensor to read data from a disc and a write element to write data to the disc. The preamplifier may be configured to activate, based on a control signal received via an input line, reading of data from a first head substantially simultaneously with reading of data from a second head, select the first head from the plurality of magnetic read/write heads based on one or more primary head selection bits stored in a first set of registers of the preamplifier, select the second head from the plurality of magnetic read/write heads based on one or more secondary head selection bits stored in a second set of registers of the preamplifier, provide data from the first head to a first output of the preamplifier, and provide data from the second head to a second output of the preamplifier.

In certain embodiments, a method may include receiving, by a preamplifier, a control signal, the preamplifier configured to be connected to a plurality of magnetic read/write heads, wherein each of the magnetic read/write heads includes a read sensor to read data from a disc and a write element to write data to the disc. Further, the method may include activating, based on the control signal, reading of data from a first head substantially simultaneously with reading of data from a second head, selecting the first head from the plurality of magnetic read/write heads based on one or more primary head selection bits stored in a first set of registers of the preamplifier, and selecting the second head from the plurality of magnetic read/write heads based on one or more secondary head selection bits stored in a second set of registers of the preamplifier. Additionally, the method may include receiving, at a first signal processing module of the preamplifier, a first read signal from the first head including the data from the first head, applying, by the first signal processing module, a first signal processing to the first read signal, the first signal processing including at least one of bias, gain and bandwidth processing, receiving, at a second signal processing module of the preamplifier, a second read signal from the second head including the data from the second head, applying, by the second signal processing module, a second signal processing to the second read signal, the second signal processing including at least one of bias, gain and bandwidth processing, providing the processed first read signal to a first output of the preamplifier, and providing the processed second read signal to a second output of the preamplifier.

DETAILED DESCRIPTION

Figure 1:
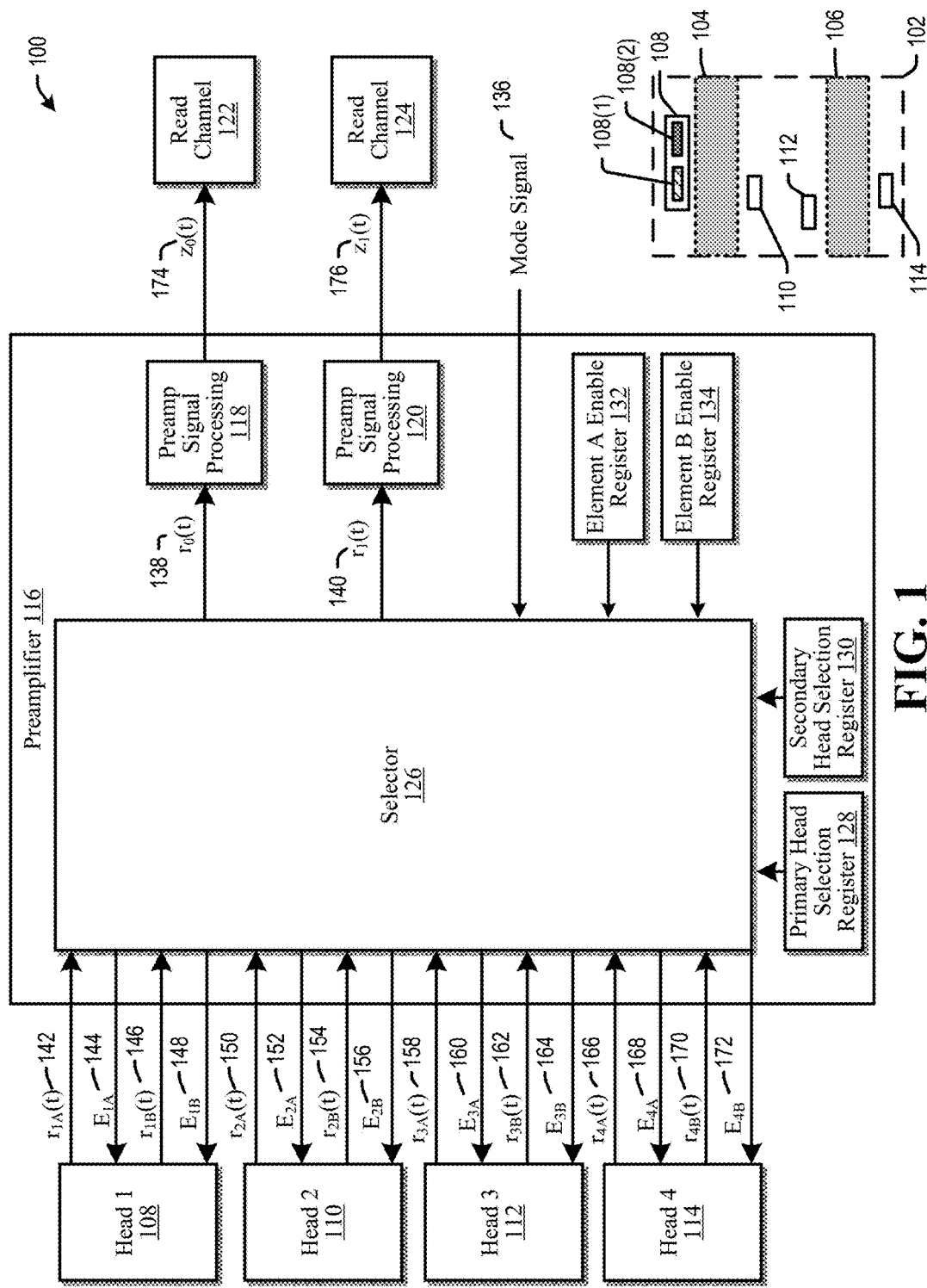
FIG. 1 is a block diagram of a system architecture which may include an independent head, dual reader mode of operation, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure generally relates to magnetic recording systems that may simultaneously read using multiple read sensors, and in some embodiments, the present disclosure may relate to simultaneously reading using read sensors of different read heads of a magnetic recording device.

The present disclosure may relate to systems that may implement MSMR or two dimensional magnetic recording (TDMR) technologies. In such systems, the hard drive preamplifier (or preamp) devices which may support the MSMR/TDMR technology may have separate read head controls for reader bias, gain and bandwidth and separate read data paths. Further, the heads may have multiple read sensors located within a single head (slider). The preamplifier may control each of these read sensors independently and may route the read data from each sensor through the preamplifier independently to respective read channels located on the hard disk drive's printed circuit board assembly (PCBA). During some modes of operation, the read sensors being controlled and read from at a particular time may all be located within the same head (e.g. slider).

In some embodiments according to this disclosure, the systems may include an independent head, dual reader mode in which read sensors of different read heads of a magnetic recording device may be read from at the same time. For example, some embodiments may include a preamp based diagnostic test mode which may enable the preamp to use the MSMR/TDMR technology to select two or more read sensors within different read heads (different read heads within the head sliders) and route and process the read data signals using two separate read paths.

In some embodiments, the independent head, dual reader mode may be specific to the test mode. For example, the independent head, dual reader mode may not be used in normal operation as preamp functions which re-route the read head signal path within the preamp may disabled and ignored while the independent head, dual reader test mode is selected. In some embodiments, normal drive operation may be dependent upon multiple factors including the enabling of other test modes at the same time (only one set of test mode selection bits) and which other preamp settings and features are enabled. However, this is not a limitation and, in some embodiments, the independent head, dual reader mode may be used during normal drive operation.

In some embodiments, the primary (or first) head may be selected using the same head selection bits and primary head selection register used by the preamp in normal operation. The secondary (or second) head may be selected by using secondary head selection bits. The secondary head selection bits may be stored in a register designated for the independent head, dual reader mode or a register that may be repurposed from another preamp mode. In the case the register is repurposed, the register may store head selection bits or other information in the other preamp modes.

In some embodiments, the preamp may be in read mode (Write Enable=0 or low) during the independent head, dual reader test mode. In some such embodiments, if a write mode is entered (Write Enable=1), the preamp may leave the independent head, dual reader test mode and begin normal operation to write to the head selected in the normal head selection register. More particularly, in write mode (Write Enable=1), one write head may be selected. The head selected in the normal head selection register (e.g. the primary head selection register) may the active write head.

In some embodiments, a head element selection circuit or logic may operate to determine the primary head, the read sensor (also referred to herein as read element or reader) of the primary head to be used, the secondary head and the element or read sensor of the secondary head to be used based on the primary and secondary head selection bits, an reader element A enable bit and an reader element B enable bit. The reader element A enable bit and the reader element B enable bit may be repurposed from the same bits used for normal mode. In the independent head, dual reader mode, a different control logic from that used in normal operation may be used to select the elements in the different heads to enable using the reader element A enable bit and the reader element B enable bit. An example control logic is shown and described below with regard to FIG. 3. In some implementations, the read path controls (e.g., bias, gain, bandwidth) for the primary read path and the secondary read path may be the same as used for normal operation.

Referring to FIG. 1, a block diagram of a system architecture which may include an independent head, dual reader mode of operation is shown and is generally designated 100. More particularly, FIG. 1 may illustrate an example embodiment of a MSMR hard drive that may include an independent head, dual reader mode to allow for reading using reader elements or read sensors of different read heads associated with different magnetic storage surfaces.

System 100 may include a head-disk assembly (HDA) 102 that may include two magnetic storage mediums 104 and 106. The HDA 102 may further include read/write heads 108 and 110 which may read and write to the top and bottom magnetic storage surfaces of the magnetic storage medium 104, respectively, and read/write heads 112 and 114 which may read and write to the top and bottom magnetic storage surfaces of the magnetic storage medium 106, respectively. As shown with regard to the read/write heads 108, each surface may have a read head and a write head. The read head and write head of a surface may be separated by a non-negligible distance (e.g., 100 tracks). Though not shown, each of read/write heads 110-114 may also include a read head and a write head. Each of the read/write heads may include multiple read sensors (e.g. read sensor A 108(1) and read sensor B 108(2)) fabricated on a single read-head such that multiple copies of a read-back signal may be obtained simultaneously from the respective magnetic storage surface (e.g. from a particular track) and a writer (not shown) fabricated on a write-head to be utilized for data storage to the respective magnetic storage surface. Each of the read/write heads 108-114 may be mounted on a slider, all of which may connect to an actuator arm for positioning over the media. A servo control may be configured to drive a servo mechanism which may move the slider to position the read/write heads in a desired location relative to the magnetic storage surfaces of the magnetic storage mediums 104 and 106.

In addition, the system 100 may include micro head actuators that may allow for read/write head locations to deviate, by a small amount, from their location at the end of the slider arm. In some embodiments, the micro head actuators may be independently controlled from one another. This may allow for multiple heads to be positioned over respective track centers even when the track centers are not exactly aligned to the slider location. For example, micro head actuators may allow for the readers, writer, or both of 108 to be centered over a track on the top magnetic storage surface of the magnetic storage medium 104 while the readers, writer, or both of 114 are centered over a track on the bottom magnetic storage surface of the magnetic storage medium 106, even though the tracks are not exactly aligned with one another. In another example, micro head actuators may allow for the readers, writer, or both of 108 to be centered over a track on the top magnetic storage surface of the magnetic storage medium 104 while the readers, writer, or both of 110 are centered over a track on the bottom magnetic storage surface of the magnetic storage medium 104, even though the tracks are not exactly aligned with one another.

Figure 2:
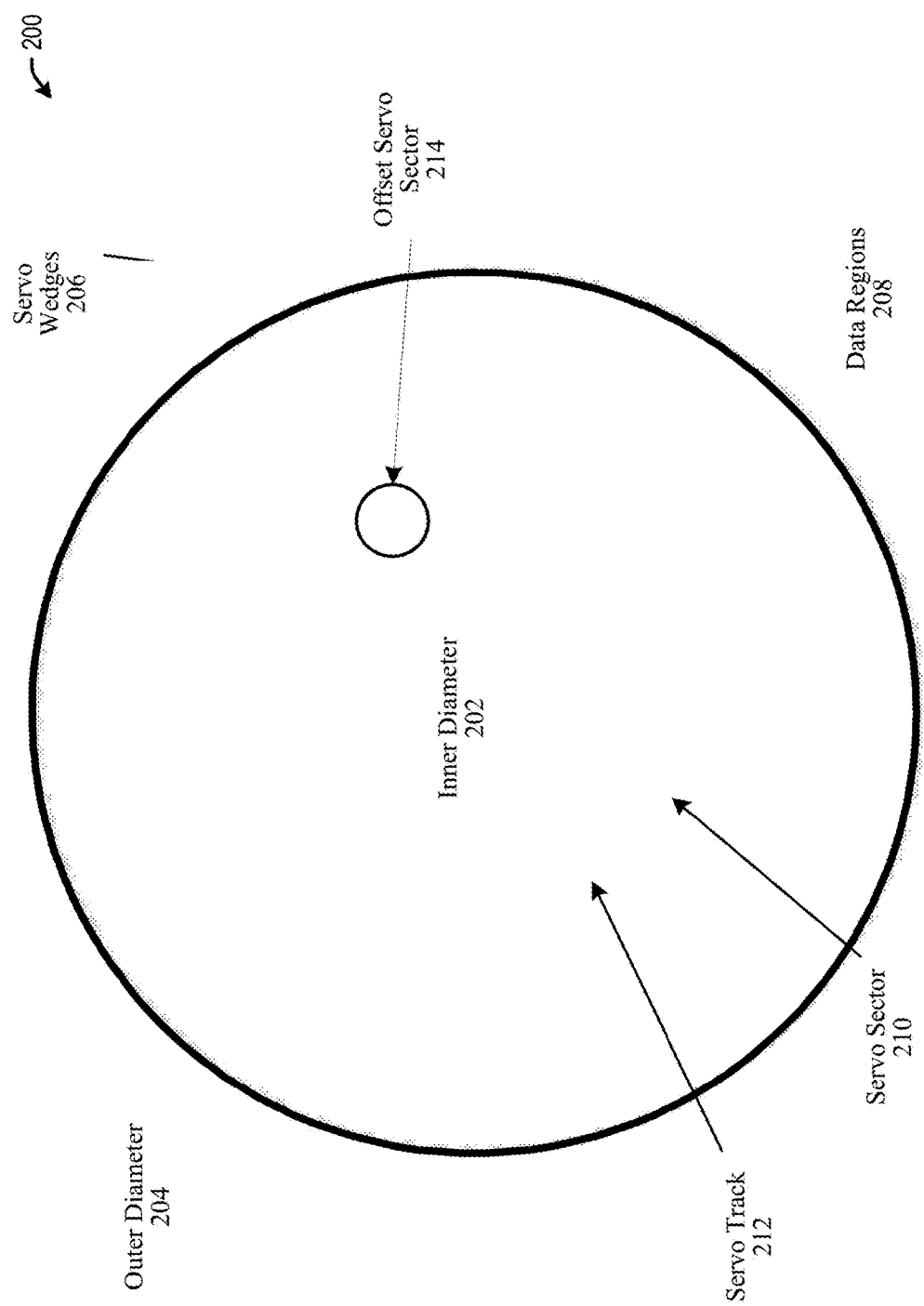
FIG. 2 illustrates a block diagram of a surface of an example magnetic storage mediums of the multi-sensor magnetic recording (MSMR) system architecture, in accordance with certain embodiments of the present disclosure.

Referring to FIG. 2, a diagram of a surface of an example magnetic storage medium (e.g. 104 and 106) of the multi-sensor magnetic recording (MSMR) system architecture 100 is shown and is generally designated 200. More particularly, surface 200 may generally show the layout of position information such as servo or RRO/ZAP fields on a surface of a magnetic storage medium of a hard disk drive.

The position information may allow the hard drive to determine the position of a read/write heads relative to the surface of the magnetic storage medium. The examples herein include parallelized reading of RRO/ZAP fields (e.g. for testing). This is merely done as an example and embodiments are not so limited and other position information schemes may be utilized.

Reliable storage of data, and its subsequent retrieval, from a hard disk drive (HDD) may require that the read/write heads be placed over the spinning media with a very high degree of accuracy. To achieve this, a servo pattern (or other position information) may be written to the media during manufacturing which may contain information regarding radial and tangential positioning on the disk. As shown in FIG. 2, the servo pattern may span from the inner diameter 202 of the disk to the outer diameter of the disk 204 and may be placed at regular intervals around the disk. As shown, the servo wedges 206 may be separated by data regions 208 that may store non-servo data (e.g. user data). The servo pattern may be demodulated each time a read-head passes over a servo sector 210 in the servo wedges 206. The demodulated information may then be used to determine a location of the read-head from which the write/head position may be inferred. Based on the determined location of the read/write head, deviations from the desired position may be determined and rectified to maintain the integrity of the operation (e.g. read/write/seek/etc.).

As mentioned above, writing the servo pattern to the disk may be accomplished at the time of manufacturing using either a dedicated machine (known as a servo disk writer (SDW) or a multi-disk writer (MDW)) or through a process known as self-servo write (SSW), in which the embedded controller may be used to write servo pattern. Although the servo pattern may be directly used for the servo operation, its use may be complicated by written-in eccentricities in the servo pattern, a phenomenon depicted in FIG. 2. As shown, a servo track 212 may be defined as a set of servo sectors 210 written at an (approximately) equal radius from the disk center (e.g. servo sectors sharing a track id, which may be written into the servo sectors). Due to imperfections in the servo writing procedure, not all servo sectors may fall on the idealized, circular, track shown as the dashed line of the servo track 212 in FIG. 2 (offset servo sector 214). As such, an attempt to follow the written servo track 212 may entail moving the read-head continually inwards and outwards to match the trajectory of the irregularly shaped track 212. This phenomenon, known as repeatable runout (RRO), may cause performance degradation and may limit the achievable linear track density of an HDD.

In some examples, RRO, which may generally be characterized as a non-zero mean of the generated radial position error associated with a given servo sector 210, may be compensated. For this, after the servo pattern is written, the system may learn the eccentricity by following a given servo track 212 and monitoring a repeatable portion. The learned values may be used to generate compensation factors that may then be written as fields following each servo sector 210 such that the compensation factors may be retrieved and used during normal operation of the servo system. These fields may be referred to as either RRO fields or Zero Acceleration Profile (ZAP) fields.

The process of writing and testing ZAP fields may be time consuming. Although the time to compute the compensation values may be reduced by only considering a subset of tracks and using interpolation to determine the values in-between, the writing process may be conducted for every servo sector 210 on the magnetic storage surface 200. As a longer manufacturing time may directly correspond to an increase in cost, reducing manufacturing time may be desirable. Some embodiments herein may allow for the parallelization of the ZAP field creation or testing process and, more particularly, for simultaneous reading of multiple magnetic storage surfaces. However, as mentioned above, embodiments are not limited to writing or testing ZAP fields or servo information. Rather, embodiments may be applied to parallelized reading of any information from multiple disk surfaces. Further, in some embodiments, the architecture disclosed herein may require minimal changes from a MSMR architecture.

As mentioned above, the systems and techniques disclosed herein may allow for the parallelized reading of a plurality of magnetic storage surfaces, which may be used in ZAP field creation or testing which may save significant manufacturing time that is otherwise consumed with this activity. Also, while examples herein include two read sensors per read/write head, this is not limiting and, in view of this disclosure, one of ordinary skill in the art would understand that the systems and techniques may be expanded to any number of read sensors per read/write head.

Returning to FIG. 1, the disclosed HDA 102 and multi-sensor magnetic recording (MSMR) system architecture 100 may include coupling of the read sensors of the read/write heads 108-114 to preamplifier 116 which may include a selector 126 which may be coupled to preamp signal processing modules 118 and 120 which in turn may be coupled to respective read channels 122 and 124. The preamplifier may further include a primary head selection register 128, secondary head selection register 130, an element A enable register 132 and an element B enable register 134.

Each of the HDA 102, the preamplifier 116, and the read channels 122 and 124 may be a separate circuit, a system on chip (SOC), firmware, a processor(s), or other system not listed, or any combination thereof.

As mentioned above, the read/write heads 108-114 (e.g. the read sensors or read-elements thereof) may read from respective magnetic storage surfaces of the magnetic storage mediums 104 and 106. In the illustrated example, each read/write head 108-114 may include two read sensors, referred to herein as read sensor A and read sensor B of the read head. Each read sensor may be configured to selectively produce a continuous time signal from magnetic interactions with the respective surface of the read sensor based on a corresponding reader enable signal received from the selector 126.

More particularly, read sensor A of head 1 108 may produce a continuous time signals $r_{1A}(t)$ 142 when the enable signal $E_{1A}$ 144 is set to enable the read sensor and read sensor B of head 1 108 may produce a continuous time signals $r_{1B}(t)$ 146 when the enable signal $E_m$ 148 is set to enable the read sensor. Read sensor A of head 2 110 may produce a continuous time signals $r_{2A}(t)$ 150 when the enable signal $E_{2A}$ 152 is set to enable the read sensor and read sensor B of head 2 110 may produce a continuous time signals $r_{2B}(t)$ 154 when the enable signal $E_{2B}$ 156 is set to enable the read sensor. Read sensor A of head 3 112 may produce a continuous time signals $r_{3A}(t)$ 158 when the enable signal $E_{3A}$ 160 is set to enable the read sensor and read sensor B of head 3 112 may produce a continuous time signals $r_{3B}(t)$ 162 when the enable signal $E_{3B}$ 164 is set to enable the read sensor. Read sensor A of head 4 114 may produce a continuous time signals $r_{4A}(t)$ 166 when the enable signal $E_{4A}$ 168 is set to enable the read sensor and read sensor B of head 4 114 may produce a continuous time signals $r_{4B}(t)$ 170 when the enable signal $E_{4B}$ 172 is set to enable the read sensor.

The selector 126 may be configured to selectively enable the read sensors of the read/write heads 108-114 and direct the continuous time signals produced by the enabled read sensors of the read/write heads 108-114 to the preamp processing modules 118 and 120 such that continuous time input signals from the enabled read sensor may be provided to the preamp signal processing modules 118 and 120 as continuous time input signals $r_0(t)$ 138 and $r_1(t)$ 140. More particularly, the selector 126 may select read sensors to enable based on primary head selection bits stored in the primary head selection register 128, secondary head selection bits stored in the secondary head selection register 130, an element A enable bit stored in the element A enable register 132 and an element B enable bit stored in the element B enable register 134. The control logic utilized by the selector 126 may vary based on different modes of operation.

In some embodiments, the selector 126 may receive a mode signal 136 that may be used to determine mode of operation of the control logic of the selector 126.

For example, in a normal operation mode, the selector 126 may select a read/write head based on the primary head selection bits and, based on one or more of the element A enable bit and the element B enable bit, determine the output to direct the read signal from sensor A of that head to and the output to direct the read signal from sensor B of that head to (e.g. which of continuous time input signals $r_0(t)$ 138 and $r_1(t)$ 140 to direct each read signal to).

In the independent head, dual reader mode, the selector 126 may select a first read/write head based on the primary head selection bits stored in the register 128 and a second read/write head based on the secondary head selection bits stored in the register 130. As mentioned previously, the secondary head selection register 130 may be repurposed from another mode of operation. Based on the element A enable bit and the element B enable bit, the selector 126 may determine which sensor of the primary head and sensor of the secondary head to enable. The read signal from the enabled sensor of the primary head may be output as continuous time input signal $r_0(t)$ 138 and the read signal from the enabled sensor of the secondary head may be output as continuous time input signals $r_1(t)$ 140. An example control logic for the selector 126 in the independent head, dual reader mode is provided below with regard to FIG. 3.

The preamp signal processing modules 118 and 120 may process $r_0(t)$ 138 and $r_1(t)$ 140 to produce filtered and gain-adjusted continuous time input signals $z_0(t)$ 174 and $z_1(t)$ 176 which may in turn be provided to the read channels 122 and 124 respectively. For example, in operation, the preamp signal processing modules may each receive a continuous-time signal and perform processing such as analog filtering and applying a gain.

As would be understood by one of ordinary skill in the art, functionality of the selector 126 and the preamp signal processing modules 118 and 120 may be combined or divided in a variety of ways.

The read channels 122 and 124 may process the filtered and gain-adjusted continuous time input signals $z_0(t)$ 174 and $z_1(t)$ 176, respectively. Depending on what operation is being performed generally, the processing may differ. In an example in which the RRO/ZAP field data is to be tested, the read channels may process the signals $z_0(t)$ 174 and $z_1(t)$ 176 to determine if the position information written to the magnetic surfaces is correct. In an example in which RRO/ZAP fields are to be written, the read channels 122 and 124 may detect already written servo information and output a RRO/ZAP field data that may be written by a respective writer to the respective magnetic storage surface. In other examples in which servo fields are to be written, similar operations may be performed by the read channels 122 and 124 with regard to pre-servo field markings (e.g. spiral patterns).

As mentioned before, the architecture illustrated in FIG. 1 may be an example embodiment which has few changes from an MSMR architecture. It should be noted that embodiments according to this disclosure are not so limited and may include architectures performing similar functions.

Figure 3:
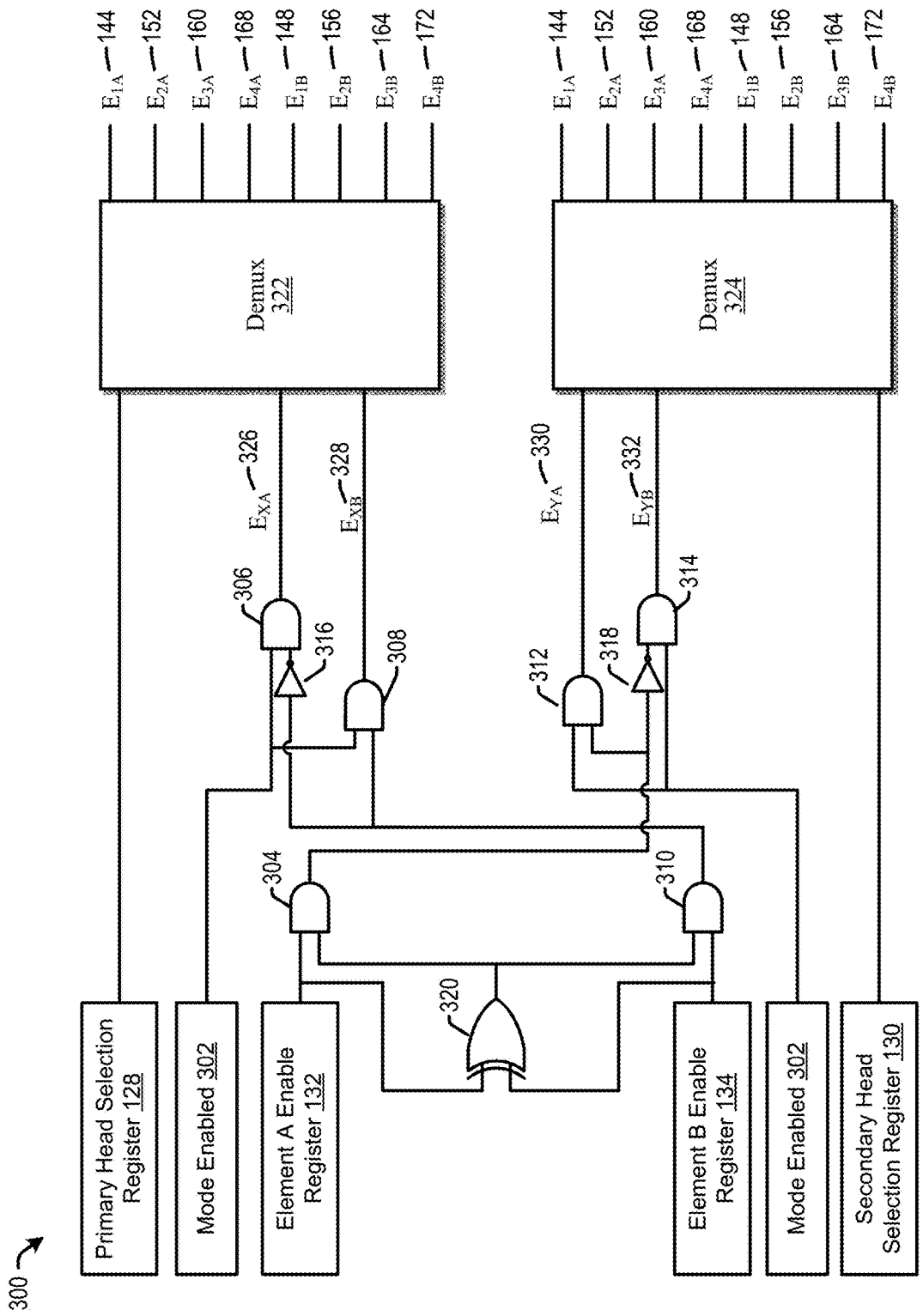
FIG. 3 illustrates a block diagram of an example control logic for a selector configured to operate in an independent head, dual reader mode, in accordance with certain embodiments of the present disclosure.

FIG. 3 illustrates a block diagram of an example control logic for a selector configured to operate in an independent head, dual reader mode is shown and is generally designated 300. More particularly, FIG. 3 may illustrate an example embodiment of a control logic for a selector similar to selector 126 shown in FIG. 1. In the illustrated example of FIG. 3, the selector may operate to determine which read sensors of a primary read/write head and a secondary read/write head to enable and then output an enable signal to each determined read sensor. The selector of FIG. 3 may determine the read sensors to enable based on primary head selection bits stored in the primary head selection register 128, secondary head selection bits stored in the secondary head selection register 130, an element A enable bit stored in the element A enable register 132 and an element B enable bit stored in the element B enable register 134.

As with FIG. 1, a system including the selector of FIG. 3 may utilize the multiple read paths of a MSMR architecture. However, instead of reading using the multiple read sensors disposed above each surface, in the independent head, dual reader mode, system 300 may direct a read signal from a read sensor above each of multiple surfaces over a respective one of the multiple read paths. In some examples, the system may use micro head actuator technology to enable each read/write head to be positioned at respective desired locations.

As shown, the selector of FIG. 3 may include respective registers 128-134 to store the primary head selection bits, the secondary head selection bits, the element A enable bit, and the element B enable bit. The selector may receive a mode enabled signal 302 that may indicate the independent head, dual reader mode is active (e.g. that the mode signal 136 indicates the preamplifier should operate in the independent head, dual reader mode). In other words, when the independent head, dual reader mode is active, the mode enabled signal 302 may be set to true. The selector of FIG. 3 may further include AND gates 304-314, inverters 316-318, an exclusive or (XOR) gate 320, and demultiplexers 322 and 324.

In operation, the mode enabled signal 302 may be directed to the AND gate 304, the AND gate 306, the AND gate 312, and the AND gate 314. The element A enable register 132 may output the element A enable bit to the AND gate 304 and the XOR gate 320. Similarly, the element B enable register 134 may output the element B enable bit to the AND 310 and the XOR gate 320. The output of the XOR gate 320 may be directed to the AND gates 304 and 310. The output of the AND gate 304 may be directed to the inverter 318. The output of the inverter 318 may be directed to the AND gate 314. The output of the AND gate 310 may be provided to the inverter 316 and the AND gate 308. The output of the inverter 316 may be provided to the AND gate 306.

The AND gate 306 may output an enable read head X sensor A ($E_{XA}$) signal 326 to the demultiplexer 322. The AND gate 308 may output an enable read head X sensor B ($E_{XB}$) signal 328 to the demultiplexer 322. The AND gate 312 may output an enable read head Y sensor A ($E_{YA}$) signal 330 to the demultiplexer 324. The AND gate 314 may output an enable read head Y sensor B ($E_{XB}$) signal 332 to the demultiplexer 324.

As a result of the above described control logic, the values of $E_{XA}$ 326, $E_{XB}$ 328, $E_{YA}$ 330 and $E_{YB}$ 332 for specified values of the element A enable bit 132 (e.g. RA_En) and the element B enable bit 134 (e.g. RB_En) of the may be given by Table 1.

TABLE 1

| | | Head X | | Head Y | |
|---|---|---|---|---|---|
| RA_En | RB_En | $E_{XA}$ | $E_{XB}$ | $E_{YA}$ | $E_{YB}$ |
| 0 | 0 | 1 | 0 | 0 | 1 |
| 0 | 1 | 0 | 1 | 0 | 1 |
| 1 | 0 | 1 | 0 | 1 | 0 |
| 1 | 1 | 1 | 0 | 0 | 1 |

The demultiplexer 322 may receive the primary head selection bits from the primary head selection register 128 and the element enable signals $E_{XA}$ 326 and $E_{XB}$ 328. Based on the primary head selection bits, the demultiplexer 322 may select one of four read/write heads and output $E_{XA}$ 326 and $E_{XB}$ 328 to the read sensor enable inputs of the selected primary head (e.g. $E_{1A}$-$E_{4B}$).

Similarly, the demultiplexer 324 may receive the secondary head selection bits from the secondary head selection register 130 and the element enable signals $E_{YA}$ 330 and $E_{YB}$ 332. Based on the secondary head selection bits, the demultiplexer 324 may select one of four read/write heads and output $E_{YA}$ 330 and $E_{YB}$ 332 to the read sensor enable inputs of the selected secondary head (e.g. $E_{1A}$-$E_{4B}$).

Though not shown, one of ordinary skill in the art would understand that the outputs of the read sensors may be input to a primary multiplexer and a secondary multiplexer which may select the enabled read sensor signals and direct the selected signals to the preamp processing modules 118 and 120 based on the primary head selection bits, the secondary head selection bits, the element A enable bit, and the element B enable bit.

Although this disclosure provided examples of parallelizing reading from two storage surfaces, the systems and processes disclosed herein may be generalized to an arbitrary number of storage surfaces. For example, some embodiments may provide parallelization beyond the number of readers by adding additional read-signal input ports and read channels. One of ordinary skill in the art would envision many additional variations in view of this disclosure.

Figure 4:
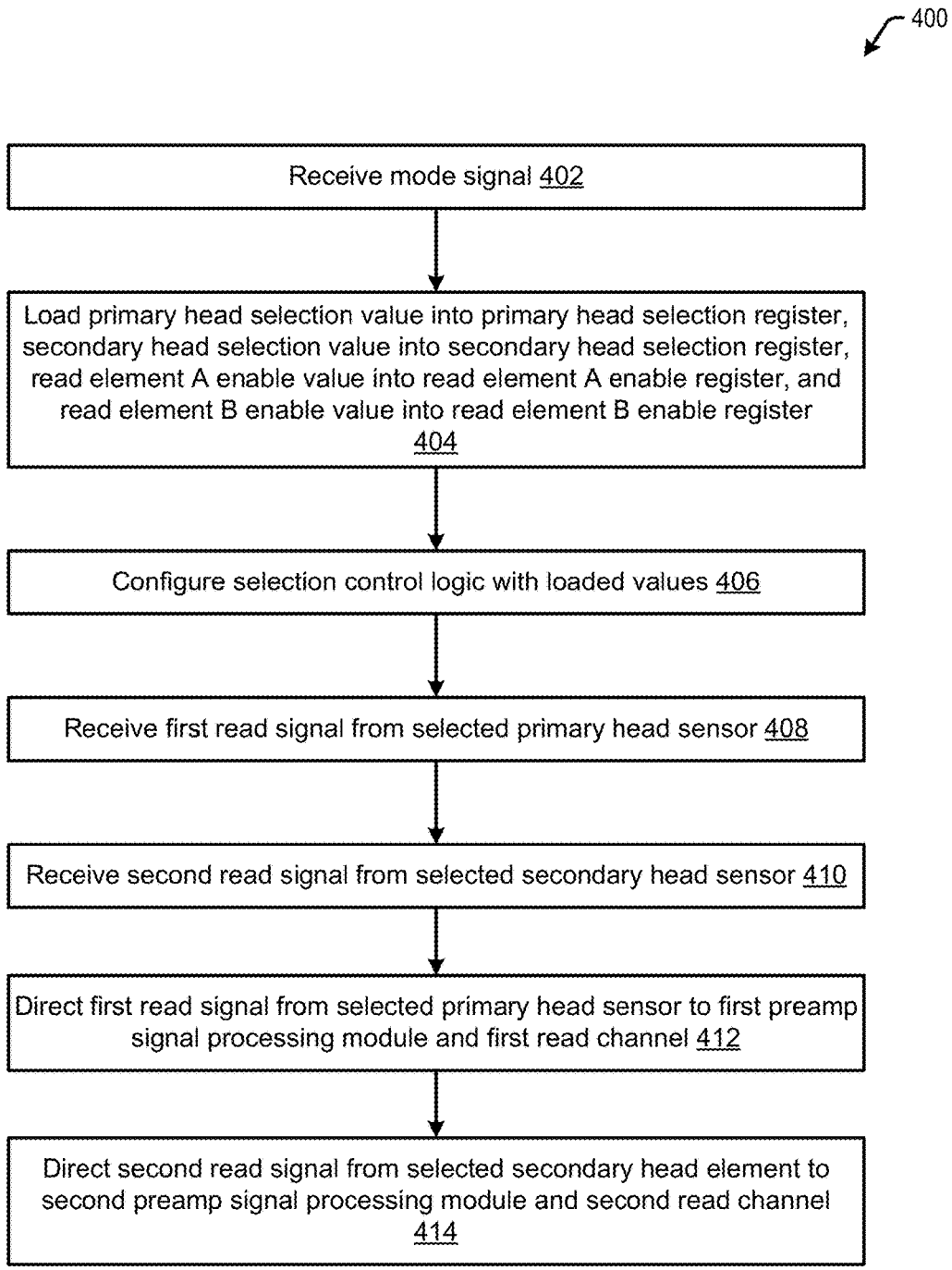
FIG. 4 is a flowchart of a method that may control a MSMR storage device to operate in an independent head, dual reader mode to read information from multiple storage surfaces, in accordance with certain embodiments of the present disclosure.

Referring to FIG. 4, a flowchart of a method that may control a MSMR storage device to operate in an independent head, dual reader mode to read information from multiple storage surfaces is shown and is generally designated 400. More particularly, flowchart 400 may be a flow of operations of the systems 100-300 detailed above with respect to FIGS. 1-3.

In operation, the system may receive a mode signal at 402. For example, the system may receive a mode signal changing the mode of operation to the independent head, dual reader mode discussed above.

At 404, the system may load a primary head selection value into a primary head selection register, a secondary head selection value into a secondary head selection register, a read element A enable value into a read element A enable register, and a read element B enable value into read element B enable register. At 406, the system may configure the selection control logic (e.g. of the selector 126) with the loaded values. As a result, the selected sensors of the indicated primary and secondary read heads may be enabled and the selector may be configured to direct the output of the selected sensors to the respective preamp signal processing modules.

At 408, the system may receive the first read signal from the selected primary head sensor. At 410, the system may receive the second read signal from the selected secondary head sensor. At 412, the system may direct the first read signal from the selected primary head sensor to a first preamp signal processing module and a first read channel. At 414, the system may direct the second read signal from the selected secondary head sensor to a second preamp signal processing module and a second read channel.

All steps listed for the method 400 may be applied to multiple input systems. Many variations would be apparent in view of this disclosure. Further, though FIGS. 1-3 discuss examples involving the parallelized reading of RRO/ZAP fields, embodiments are not so limited and other embodiments may utilize the same techniques to perform parallelized reading of other position information. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 5:
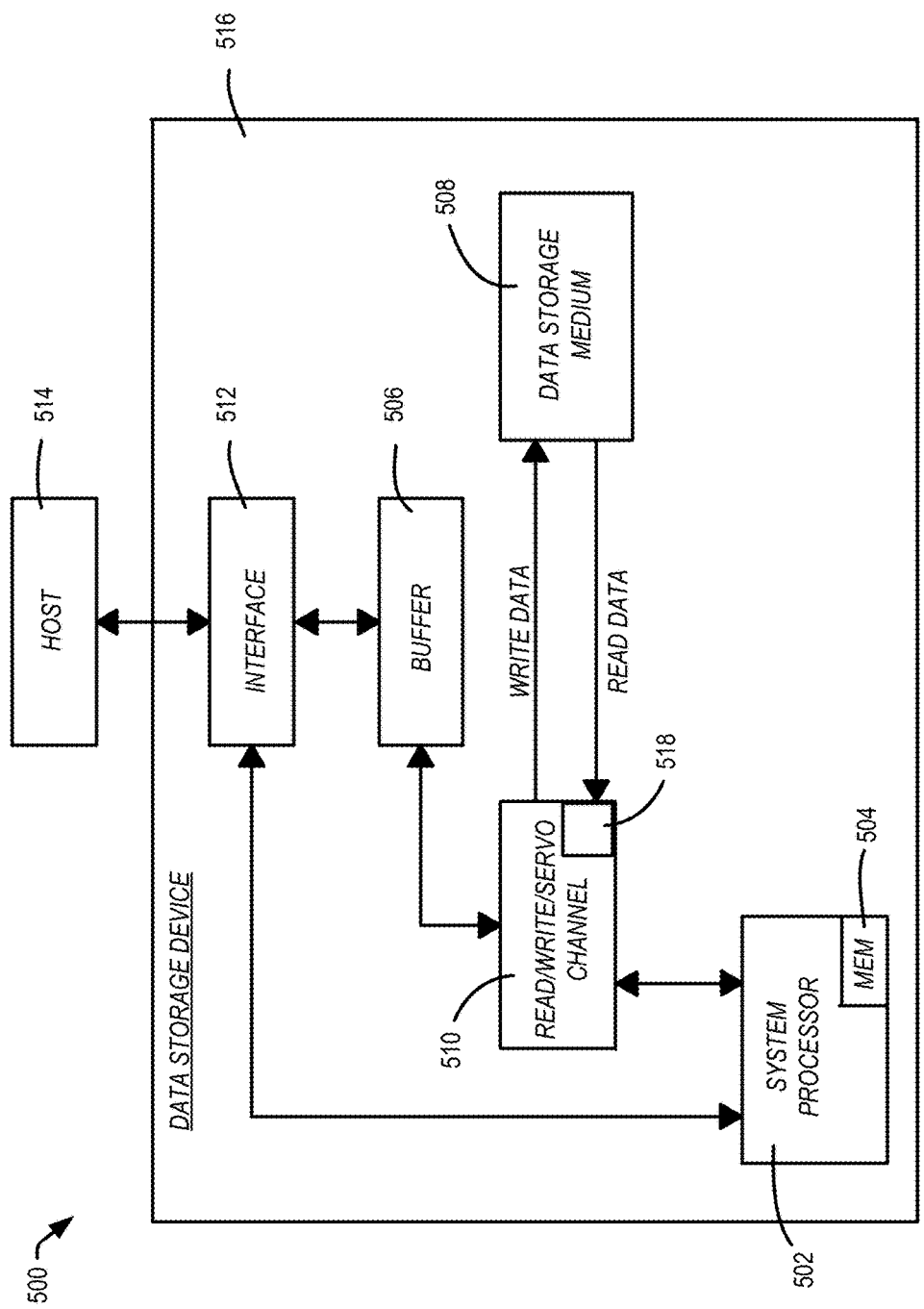
FIG. 5 is a block diagram of a system including a multi-sensor magnetic recording (MSMR) system architecture which may include functionality to operate in an independent head, dual reader mode, in accordance with certain embodiments of the present disclosure.

Referring to FIG. 5, a block diagram of a system including a multi-sensor magnetic recording (MSMR) system architecture which may include functionality to operate in an independent head, dual reader mode is shown and generally designated 500. The system 500 can be an example of a data storage device (DSD), and may be an example implementation of system 100. The DSD 516 can optionally connect to and be removable from a host device 514, which can be a device or system having stored data, such as a desktop computer, a laptop computer, a server, a digital video recorder, a photocopier, a telephone, a music player, other electronic devices or systems not listed, or any combination thereof. The data storage device 516 can communicate with the host device 514 via the hardware/firmware based host interface circuit 512 that may include a connector (not shown) that allows the DSD 516 to be physically connected and disconnected from the host 514.

The DSD 516 can include a system processor 502, which may be a programmable controller, and associated memory 504. The system processor 502 may be part of a system on chip (SOC). A buffer 506 may temporarily store data during read and write operations and can include a command queue. The read/write (R/W) channel 510 can encode data during write operations to, and reconstruct data during read operations from, the data storage medium 508. The data storage medium 508 is shown and described as a hard disc drive, but may be other types of magnetic medium, such as a flash medium, optical medium, or other medium, or any combination thereof.

The R/W channel 510 may receive data from more than one data storage medium at a time, and in some embodiments can also receive multiple data signals concurrently, such as from more than one output of a reader. Multi-sensor magnetic recording (MSMR) systems can receive two or more inputs from multiple sources (e.g. recording heads, flash memory, optical memory, and so forth) associated with the same magnetic medium. The R/W channel 510 can combine multiple inputs and provide a single output, as described in examples herein.

The block 518 can implement all of or part of the systems and functionality of systems and methods 100-400. In some embodiments, the block 518 may be a separate circuit, integrated into the R/W channel 510, included in a system on chip, firmware, software, or any combination thereof.

In the examples discussed herein, two signals are received and processed. However, the systems and methods discussed herein may be generalized to any number (N) of signals. Many variations would be apparent to one of ordinary skill in the art in view of this disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a preamplifier configured to be connected to a plurality of magnetic read/write heads, wherein each of the magnetic read/write heads includes a read sensor to read data from a disc and a write element to write data to the disc;
the preamplifier including:
a first set of registers configured to indicate a first head of the plurality of magnetic read/write heads that is selected for reading data;
a second set of registers configured to indicate a second head of the plurality of magnetic read/write heads that is selected for reading data;
an input line configured to receive a control signal to activate reading data from the first head substantially simultaneously with reading data from the second head;
a first output to provide data from the first head; and
a second output to provide data from the second head.

2. The apparatus of claim 1, further comprising each of the magnetic read/write heads including another read sensor.

3. The apparatus of claim 2, further comprising the magnetic read/write heads being magnetic read/write heads of one of a multi-sensor magnetic recording (MSMR) hard drive and a two dimensional magnetic recording (TDMR) hard drive.

4. The apparatus of claim 2, further comprising the preamplifier including a plurality of registers configured to store one or more enable values that indicate a first selected read sensor of the first head of the plurality of magnetic read/write heads and a second selected read sensor of the second head of the plurality of magnetic read/write heads.

5. The apparatus of claim 4, further comprising the preamplifier further including:
a selection module that, based on the control signal, determines:
the first head of the plurality of magnetic read/write heads that is selected for reading data based on at least one first value stored in the first set of registers;
the second head of the plurality of magnetic read/write heads that is selected for reading data based on at least one second value stored in the second set of registers; and
the first selected read sensor of the first head of the plurality of magnetic read/write heads and the second selected read sensor of the second head of the plurality of magnetic read/write heads based on the one or more enable values.

6. The apparatus of claim 5, further comprising:
the control signal activating a first mode of operation; and
the input line configured to receive another control signal to activate a second mode of operation in which data is read from multiple read sensors of the first head substantially simultaneously.

7. The apparatus of claim 6, further comprising the second set of registers being used for a feature of the preamplifier other than head selection in the second mode of operation.

8. The apparatus of claim 1, further comprising:
the preamplifier further including:
a first signal processing module configured to:
receive a first read signal from the first head including the data from the first head; and
apply a first signal processing to the first read signal, the first signal processing including at least one of bias, gain and bandwidth processing; and
a second signal processing module configured to:
receive a second read signal from the second head including the data from the second head; and
apply a second signal processing to the second read signal, the second signal processing including at least one of bias, gain and bandwidth processing.

9. The apparatus of claim 8, further comprising:
a first read channel configured to receive, from the first output, the processed first signal from the first head, the first read channel controlling the at least one of the bias, gain and bandwidth processing of the first signal processing; and
a second read channel configured to receive, from the second output, the processed second signal from the second head, the second read channel controlling the at least one of the bias, gain and bandwidth processing of the second signal processing.

10. A system comprising:
a preamplifier configured to be connected to a plurality of magnetic read/write heads, wherein each of the magnetic read/write heads includes a read sensor to read data from a disc and a write element to write data to the disc;

the preamplifier further configured to:
  activate, based on a control signal received via an input line, reading of data from a first head substantially simultaneously with reading of data from a second head;
  select the first head from the plurality of magnetic read/write heads based on one or more primary head selection bits stored in a first set of registers of the preamplifier;
  select the second head from the plurality of magnetic read/write heads based on one or more secondary head selection bits stored in a second set of registers of the preamplifier;
  provide data from the first head to a first output of the preamplifier; and
  provide data from the second head to a second output of the preamplifier.

11. The system of claim 10 further comprising:
each of the magnetic read/write heads including another read sensor.

12. The system of claim 11 further comprising the magnetic read/write heads being magnetic read/write heads of one of a multi-sensor magnetic recording (MSMR) hard drive and a two dimensional magnetic recording (TDMR) hard drive.

13. The system of claim 11 further comprising:
the preamplifier further configured to:
  select a first selected read sensor of the first head of the plurality of magnetic read/write heads and a second selected read sensor of the second head of the plurality of magnetic read/write heads based on one or more enable values stored in a plurality of enable registers of the preamplifier.

14. The system of claim 13 further comprising:
the control signal activating a first mode of operation;
the preamplifier further configured to:
  activate, based on another control signal received via the input line, a second mode of operation in which data is read from multiple read sensors of the first head substantially simultaneously.

15. The system of claim 14 further comprising the second set of registers being used for a feature of the preamplifier other than head selection in the second mode of operation.

16. The system of claim 10, further comprising:
the preamplifier further configured to:
  receive, at a first signal processing module, a first read signal from the first head including the data from the first head;
  apply, by the first signal processing module, a first signal processing to the first read signal, the first signal processing including at least one of bias, gain and bandwidth processing;
  receive, at a second signal processing module, a second read signal from the second head including the data from the second head; and
  apply, by the second signal processing module, a second signal processing to the second read signal, the second signal processing including at least one of bias, gain and bandwidth processing.

17. The system of claim 16 further comprising:
a first read channel configured to receive, from the first output, the processed first read signal including the data from the first head, the first read channel controlling the at least one of the bias, gain and bandwidth processing of the first signal processing; and
a second read channel configured to receive, from the second output, the processed second read signal including the data from the second head, the second read channel controlling the at least one of the bias, gain and bandwidth processing of the second signal processing.

18. A method comprising:
receiving, by a preamplifier, a control signal, the preamplifier configured to be connected to a plurality of magnetic read/write heads, wherein each of the magnetic read/write heads includes a read sensor to read data from a disc and a write element to write data to the disc;
activating, based on the control signal, reading of data from a first head substantially simultaneously with reading of data from a second head;
selecting the first head from the plurality of magnetic read/write heads based on one or more primary head selection bits stored in a first set of registers of the preamplifier;
selecting the second head from the plurality of magnetic read/write heads based on one or more secondary head selection bits stored in a second set of registers of the preamplifier;
receiving, at a first signal processing module of the preamplifier, a first read signal from the first head including the data from the first head;
applying, by the first signal processing module, a first signal processing to the first read signal, the first signal processing including at least one of bias, gain and bandwidth processing;
receiving, at a second signal processing module of the preamplifier, a second read signal from the second head including the data from the second head;
applying, by the second signal processing module, a second signal processing to the second read signal, the second signal processing including at least one of bias, gain and bandwidth processing;
providing the processed first read signal to a first output of the preamplifier; and
providing the processed second read signal to a second output of the preamplifier.

19. The method of claim 18 further comprising
each of the magnetic read/write heads including another read sensor; and
the method further comprising:
  selecting a first selected read sensor of the first head of the plurality of magnetic read/write heads and a second selected read sensor of the second head of the plurality of magnetic read/write heads based on one or more enable values stored in a plurality of enable registers of the preamplifier.

20. The method of claim 18 further comprising:
receiving, by the preamplifier, another control signal; and
activating, based on the other control received via the input line, a second mode of operation in which data is read from multiple read sensors of the first head substantially simultaneously.

* * * * *